US009096385B2

(12) United States Patent
Houssian et al.

(10) Patent No.: US 9,096,385 B2
(45) Date of Patent: Aug. 4, 2015

(54) AGRICULTURAL CONVEYOR WITH CARRIAGE ROLLER ATTACHMENT (71) Applicants: Terry Douglas Houssian, Regina (CA); Bradley Metro Zazula, Regina (CA)

(72) Inventors: Terry Douglas Houssian, Regina (CA); Bradley Metro Zazula, Regina (CA)

(73) Assignee: Meridian Manufacturing, Inc, Winnipeg, Mamtoba (CA)

(*) Notice: Subject to any disclaimer, the term of this patent is extended or adjusted under 35 U.S.C. 154(b) by 207 days.

(21) Appl. No.: 13/845,259

(22) Filed: Mar. 18, 2013

(65) Prior Publication Data
US 2013/0270060 A1 Oct. 17, 2013

Related U.S. Application Data (60) Provisional application No. 61/624,488, filed on Apr. 16, 2012.

(51) Int. Cl.
*B65G 33/14* (2006.01)
*B65G 41/00* (2006.01)
*B65G 33/32* (2006.01)
*B65G 33/34* (2006.01)

(52) U.S. Cl.
CPC .............. *B65G 33/14* (2013.01); *B65G 33/32* (2013.01); *B65G 33/34* (2013.01); *B65G 41/006* (2013.01)

(58) Field of Classification Search
None
See application file for complete search history.

(56) References Cited

U.S. PATENT DOCUMENTS

| 1,032,850 | A | | 7/1912 | Mount |
| 2,103,145 | A | | 12/1937 | Carter |
| 2,224,991 | A | | 12/1940 | Schweickart et al. |
| 2,528,917 | A | | 11/1950 | Slocum |
| 2,610,727 | A | | 9/1952 | Beldin |
| 2,623,624 | A | * | 12/1952 | Slocum ........................ 198/304 |
| 2,769,526 | A | | 11/1956 | Herscovitch |
| 2,825,443 | A | | 3/1958 | Howe |
| 2,998,123 | A | | 8/1961 | Kooiker et al. |
| 3,038,591 | A | | 6/1962 | Stauth |
| 3,092,239 | A | | 6/1963 | Mayrath |
| 3,139,968 | A | | 7/1964 | Stauth |
| 3,189,168 | A | | 6/1965 | Coats et al. |
| 3,198,320 | A | | 8/1965 | Mayrath et al. |
| 3,249,210 | A | | 5/1966 | Mayrath et al. |
| 3,379,301 | A | | 4/1968 | Kopaska |
| 3,647,052 | A | | 3/1972 | Edinger |
| 5,492,217 | A | | 2/1996 | Stewart |

FOREIGN PATENT DOCUMENTS

| GB | 596632 | 6/1945 |
| GB | 2025881 | 1/1980 |

* cited by examiner

*Primary Examiner* — Kavel Singh
(74) *Attorney, Agent, or Firm* — Ryan W. Dupuis; Kyle R. Satterthwaite; Ade & Company Inc.

(57) ABSTRACT

In an agricultural conveyor, an auger housing is formed of modular tube sections and an inline drive assembly for driving rotation of the auger member relative to the auger housing which is connected in series between the modular tube sections. The auger housing is supported on an adjustable carriage frame for transport. The auger housing is supported on a portion of the carriage frame by a roller assembly having rollers engaging diametrically opposed top and bottom sides of the auger housing for rolling movement along the auger housing. The connection between at least one adjacent pair of modular tube sections is arranged to allow the roller assembly to roll across the connection along the length of the assembled auger housing.

20 Claims, 9 Drawing Sheets

AGRICULTURAL CONVEYOR WITH CARRIAGE ROLLER ATTACHMENT

This application claims the benefit under 35 U.S.C. 119(e) of U.S. provisional application Ser. No. 61/624,488, filed Apr. 16, 2012.

FIELD OF THE INVENTION

The present invention relates to an agricultural conveyor including a carriage which is attached to an auger housing of the conveyor by a roller assembly to adjust a height of the auger housing, and more particularly the present invention relates to a conveyor housing which is formed in modular sections arranged so that the roller assembly can roll over the connection between adjacent modular sections. The present invention further relates to an inline drive which is particularly suited for use with the modular construction of the auger housing in sections.

BACKGROUND

Agricultural conveyors including grain augers and the like are typically available in a variety of sizes to accommodate many different uses. It is desirable for manufacturers of various size augers to assembly the various models with as many common parts as possible to reduce costs and manufacturing complexity. Some manufacturers therefore attempt to manufacture the tubular auger housing and the rotatable auger member therein in modular sections. Conventional means of attaching modular sections of the auger housing involves end flanges oriented perpendicularly to the longitudinal direction of the auger housing which are fastened together.

Grain augers are typically mounted on a wheeled carriage which provides for height and/or inclination adjustment of the auger housing by supporting a portion of the carriage for sliding movement along the auger housing. In some instances, rollers of the carriage support the auger housing thereon, however known roller arrangements generally do not provide sufficient support between the carriage and the auger housing unless an additional track is provided along the auger housing.

Various prior art configurations of attaching a portion of the carriage for movement along the auger housing are disclosed in the following patent documents: U.S. Pat. No. 3,647,052, U.S. Pat. No. 3,139,968, U.S. Pat. No. 3,092,239, U.S. Pat. No. 3,038,591, and U.S. Pat. No. 2,528,917. Known prior art configurations of height adjustable carriages are not adaptable for use with end flanges for connecting adjacent modular sections of the auger housing if using a modular construction.

Driving rotation of the auger member relative to the auger housing typically requires a drive connection at the outlet end of the auger connecting to a drive member extending externally along the auger housing. The drive member can thus interfere with connection of the portion of the carriage which is movable along the auger housing. Connection of the drive member is further complicated when various sizes of augers are to be manufactured.

One type of auger member drive which simplifies the connection of the movable portion of the carriage to the auger housing and is more accommodating to a modular construction method is the use of an inline drive. Various prior art examples of inline drives for an auger are described in the following patent documents: U.S. Pat. No. 1,032,850, U.S. Pat. No. 3,189,168, UK Patent Application GB 2 025 881, GB Patent 596,632, U.S. Pat. No. 2,610,727, U.S. Pat. No. 2,103,145, U.S. Pat. No. 2,224,991, U.S. Pat. No. 2,769,526, U.S. Pat. No. 5,492,217, U.S. Pat. No. 3,379,301, U.S. Pat. No. 2,825,443, U.S. Pat. No. 2,998,123, U.S. Pat. No. 3,198,320, and U.S. Pat. No. 3,249,210. Known inline drive configurations are complex in construction and are generally considered too unreliable for regular use in grain augers.

SUMMARY OF THE INVENTION

According to one aspect of the invention there is provided an agricultural conveyor comprising:
  an auger housing which is tubular and elongate in a longitudinal direction from an inlet end to an outlet end of the auger housing;
  an auger member rotatably supported within the auger housing so as to be arranged to convey particulate material in the longitudinal direction from the inlet end to the outlet end of the auger housing; and
  a carriage frame supporting the auger housing on wheels such that the auger housing extends at an upward inclination from the inlet end to the outlet end and such that the auger housing is arranged for rolling movement along the ground, the carriage frame comprising:
    a first frame portion coupled to the auger housing at a first location;
    a second frame portion coupled to the auger housing at a second location spaced from first location; and
    a roller assembly coupling the second frame portion to the auger housing such that the second location of the second frame portion coupled to the auger housing is movable along the auger housing in the longitudinal direction relative to the first location of the first frame portion so as to vary an elevation of the outlet end of the auger housing relative to the ground;
    the roller assembly including rollers engaging diametrically opposed top and bottom sides of the auger housing for rolling movement along the auger housing.

Use of rollers which engage opposing top and bottom sides of the auger housing provide a stable support without any additional track component being required. When used with a modular auger housing construction, the connection between adjacent auger sections can be arranged so that the rollers pass over the connection between the auger sections. The resulting carriage assembly can be readily adapted to various lengths of auger housing assembled from two or more auger sections without any modification being required to the auger housing in the form of a track for example being required. The additional use of an inline drive to drive the auger rotation relative to the auger housing further simplifies the use of carriage assembly on different auger lengths.

The rollers of the roller assembly preferably include two bottom rollers engaging the bottom side of the auger housing at spaced apart locations in the longitudinal direction and at least one top roller engaging the top side of the auger housing at a location between the two bottom rollers in the longitudinal direction.

The roller assembly may include a roller frame which fully surrounds the auger housing and supports the rollers thereon. Preferably the second frame portion of the carriage frame is pivotally coupled to the roller frame.

The first location of the first frame portion coupled to the auger housing is preferably fixed.

When the auger housing comprises a plurality of modular sections which are coupled in series with one another, preferably the rollers of the roller assembly are arranged to roll along the auger housing in the longitudinal direction across a connection between an adjacent pair of the modular sections.

When the auger housing comprises a pair of modular sections connected in series with one another and the auger member similarly comprises a pair of modular sections connected in series with one another and associated with respective ones of the modular sections of the auger housing, the agricultural conveyor preferably further includes an inline drive assembly coupled to the auger member to drive rotation of the auger member relative to the auger housing.

The inline drive assembly preferably includes a drive member, a drive housing, a bearing assembly and an input member. The drive member may include an outer collar supported in series between the pair of modular sections of the auger housing such that an inner surface of the outer collar is substantially flush with an inner surface of the auger housing, an inner member connected in series between the pair of modular sections of the auger member for rotation therewith, and at least one connecting arm connected between the inner member and the outer collar such that the outer collar is rotatable with the auger member relative to the auger housing. The drive housing may be connected in series between the pair of modular sections of the auger housing so as to fully surround the drive member, in which the drive housing includes a first member joined to one of the modular sections of the auger housing and a second member joined to the other modular section of the auger housing. Preferably the first member and the second member of the drive housing are joined to one another about a full circumference of the auger housing. Each of the first member and the second member of the drive housing may further include a collar portion having an inner surface which is substantially flush with the inner surface of the auger housing and may be supported in series between the outer collar of the drive member and a respective one of the modular sections of the auger housing. The bearing assembly is preferably coupled between the outer collar of the drive member and each collar portion of the drive housing so as to rotatably support the outer collar of the drive member relative to both the first and second members of the drive housing respectively. Preferably the input member is rotatably supported on the drive housing to extend through the drive housing from an external input end arranged to receive an input rotation to an internal output end in operative connection with the drive member to drive rotation of the drive member and the auger member connected thereto in response to the input rotation.

According to a second aspect of the present invention there is provided an agricultural conveyor comprising:

an auger housing which is tubular and elongate in a longitudinal direction from an inlet end to an outlet end of the auger housing in which the auger housing comprises a plurality of modular sections which are coupled in series with one another to define at least one connection between an adjacent pair of the modular sections;

an auger member rotatably supported within the auger housing so as to be arranged to convey particulate material in the longitudinal direction from the inlet end to the outlet end of the auger housing; and a carriage frame supporting the auger housing on wheels such that the auger housing extends at an upward inclination from the inlet end to the outlet end and such that the auger housing is arranged for rolling movement along the ground, the carriage frame comprising:

a first frame portion coupled to the auger housing at a first location;

a second frame portion coupled to the auger housing at a second location spaced from first location; and a roller assembly coupling the second frame portion to the auger housing such that the second location of the second frame portion coupled to the auger housing is movable along the auger housing in the longitudinal direction relative to the first location of the first frame portion so as to vary an elevation of the outlet end of the auger housing relative to the ground;

the roller assembly including rollers being arranged to roll along the auger housing in the longitudinal direction across said at least one connection.

The connection between each adjacent pair of modular sections may comprise a pair of mounting flanges mounted on each modular section at diametrically opposing sides of the modular section such that the pair mounting flanges of one modular section are fastened to the pair of mounting flanges of the other modular section at each connection. Preferably the mounting flanges lie in a substantially common plane oriented parallel to the longitudinal direction.

The connection between each adjacent pair of modular sections may further include a pair of connection plates fixed to the pair of modular sections respectively such that each connection plate extends in a longitudinal direction beyond an end of the respective modular section of the auger housing towards the other modular section of the connection. Each connection plate is preferably generally semicircular in shape such that the pair of connection plates are coupled to form a mounting collar mounted in series between the ends of the adjacent pair of modular sections at the connection. The pairs of mounting flanges are preferably supported along opposing sides of the pair of connection plates respectively.

According to a third aspect of the present invention there is provided an agricultural conveyor comprising:

an auger housing which is tubular and elongate in a longitudinal direction from an inlet end to an outlet end of the auger housing in which the auger housing comprises a pair of modular sections connected in series with one another;

an auger member rotatably supported within the auger housing so as to be arranged to convey particulate material in the longitudinal direction from the inlet end to the outlet end of the auger housing, in which the auger member comprises a pair of modular sections connected in series with one another and associated with respective ones of the modular sections of the auger housing;

a carriage frame supporting the auger housing on wheels such that the auger housing extends at an upward inclination from the inlet end to the outlet end and such that the auger housing is arranged for rolling movement along the ground;

an inline drive assembly coupled to the auger member to drive rotation of the auger member relative to the auger housing, the inline drive assembly comprising:

a drive member including an outer collar supported in series between the pair of modular sections of the auger housing such that an inner surface of the outer collar is substantially flush with an inner surface of the auger housing, an inner member connected in series between the pair of modular sections of the auger member for rotation therewith, and at least one connecting arm connected between the inner member and the outer collar such that the outer collar is rotatable with the auger member relative to the auger housing;

a drive housing connected in series between the pair of modular sections of the auger housing so as to fully surround the drive member, the drive housing including a first member joined to one of the modular sections of the auger housing and a second member joined to the other modular section of the auger housing;

the first member and the second member of the drive housing being joined to one another about a full circumference of the auger housing;

each of the first member and the second member of the drive housing including a collar portion having an inner surface which is substantially flush with the inner surface of the auger housing and being supported in series between the outer collar of the drive member and a respective one of the modular sections of the auger housing;

a bearing assembly coupled between the outer collar of the drive member and each collar portion of the drive housing so as to rotatably support the outer collar of the drive member relative to both the first and second members of the drive housing respectively; and an input member rotatably supported on the drive housing to extend through the drive housing from an external input end arranged to receive an input rotation and an internal output end in operative connection with the drive member to drive rotation of the drive member and the auger member connected thereto in response to the input rotation.

The drive housing being formed in two parts receiving the outer collar of the rotating drive member therebetween provides an easy-to-assemble inline drive configuration of minimal cost. Furthermore, by providing an annular bearing assembly between each portion of the drive housing and the outer collar of the rotating drive member, the drive member is rotatably supported in a stable and much more reliable manner than prior art attempts of using an inline drive for driving an auger.

Preferably the first member and the second member of the drive housing are substantially symmetrical to one another about a plane oriented perpendicularly to the longitudinal direction of the auger housing.

Each of the first member and the second member of the drive housing may further include an annular bearing surface adjacent to the collar portion and may also have an inner diameter which is greater than an inner diameter of the collar portion. In this instance each bearing assembly may comprise an annular bearing member received between the outer collar of the drive member and the annular bearing surface of the respective member of the drive housing.

Preferably an outer surface of the outer collar of the drive member includes a central portion and a pair of side portions along axially opposing sides of the central portion which have an outer diameter which is less than an outer diameter of the central portion such that each side portion receives a respective one of the annular bearing members thereabout.

Some embodiments of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Referring to the accompanying figures there is illustrated an agricultural conveyor generally indicated by reference numeral 10. In the illustrated embodiment, the conveyor comprises a grain auger including an elongate auger housing 12 supported on a wheeled carriage assembly 14 to extend in a longitudinal direction at an upward inclination from an inlet end 16 to an outlet end 18.

The housing 12 is a tubular member with a circular cross section which receives an auger member 20 supported therein for rotation relative to the housing. The auger member includes an elongate shaft and helical flighting supported about the shaft such that the auger member is arranged to convey particulate material, for example grain, from the inlet end to the outlet end of the housing as it is rotated.

The auger member protrudes outwardly beyond the inlet end of the auger housing and is surrounded by a suitable guard member 22.

A discharge spout 24 is mounted at the outlet end of the housing for discharging the conveyed particulate material downwardly through a bottom opening of the spout.

The carriage assembly includes a main axle assembly 26 spanning horizontally adjacent to the ground so as to be generally perpendicular to the longitudinal direction of the housing. Two wheels 28 are rotatably supported at opposing ends of the main axle assembly 26 so as to be laterally spaced apart on opposing sides relative to the auger housing which is laterally centered therebetween. The wheels are oriented for rolling movement across the ground generally in the longitudinal direction of the housing.

The carriage assembly further includes a carriage frame including a first frame portion 30 and a second frame portion 32. The first frame portion comprises two arms 34 coupled to opposing ends of the main axle assembly 26 adjacent to the two wheels 28 respectively. The two arms extend upwardly and inwardly towards one another to be commonly pivotally coupled at the top ends thereof to a mounting collar 36 which is fixed about the auger housing at a first location nearer to the inlet end than the outlet end thereof.

The second frame portion 32 similarly comprises two arms 38 which are coupled at the bottom ends adjacent the bottom ends of the arms of the first frame portion. The two arms 38 of the second frame portion are pivotally coupled relative to the first frame portion about a horizontal axis extending parallel to the axis of rotation of the wheels so as to be perpendicular to the longitudinal direction of the housing. The two arms of the second frame portion extend upwardly and inwardly towards one another while extending in the longitudinal direction away from the first frame portion such that the top ends of the two arms are commonly pivotally coupled to a common roller assembly 40. The roller assembly 40 couples the arms 38 of the second frame portion to the auger housing at a second location nearer to the outlet end than the inlet end and in a manner which allows the second coupling location of the second frame portion to be slidable in the longitudinal direction along the auger housing. Varying the second location where the second frame portion couples to the auger housing relative to the first location where the first frame portion couples to the housing permits the upward inclination of the auger housing relative to the ground to be adjusted which in turn adjusts a height of the outlet end of the auger relative to the ground when the inlet end of the auger remains adjacent to the ground.

Figure 7:
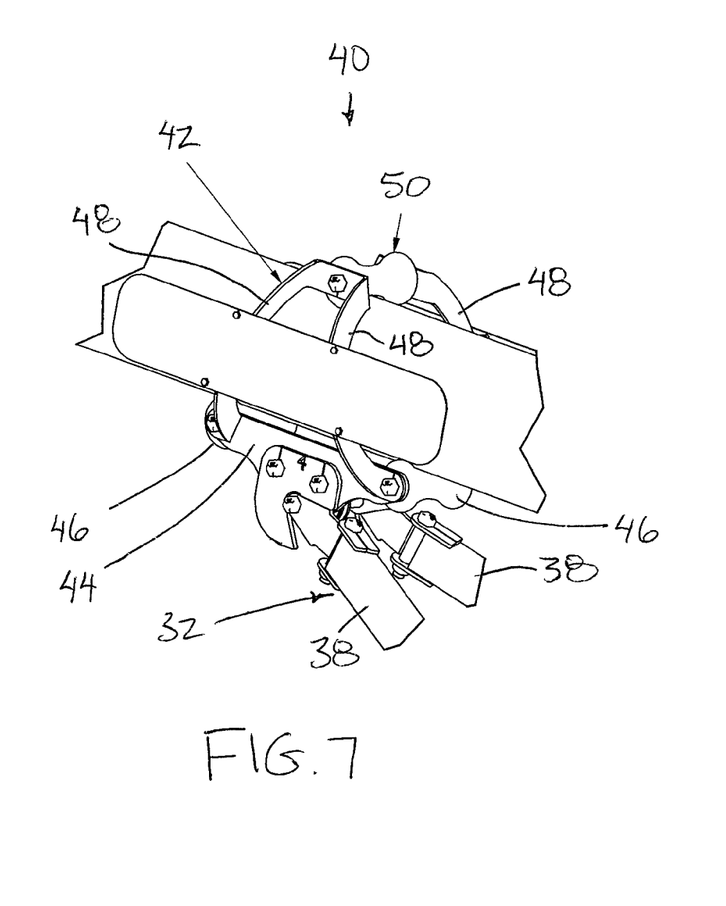
FIG. 7 is perspective view of the roller assembly connection a portion of the carriage to the auger housing in the conveyor according to FIG. 1.
Figure 8:
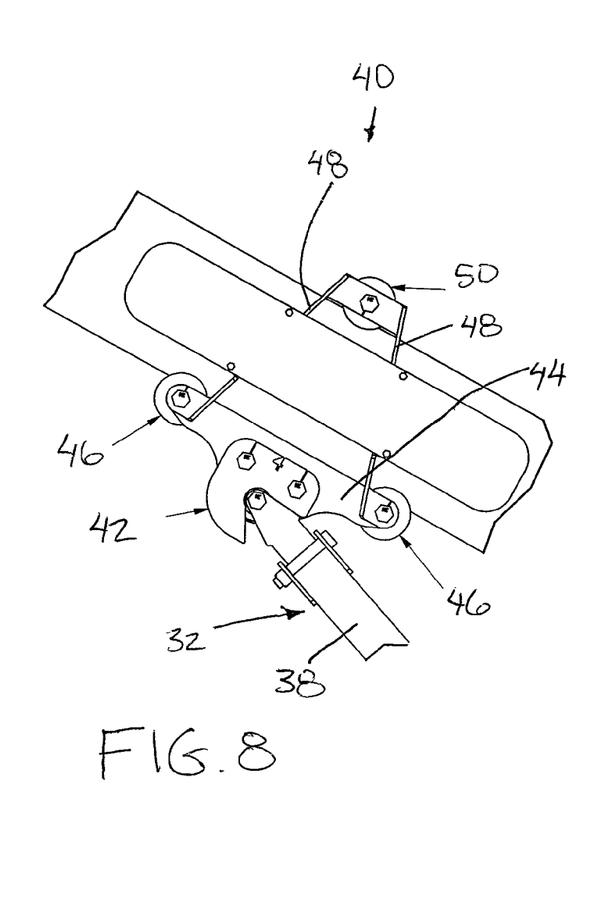
FIG. 8 is a side elevational view of the roller assembly according to FIG. 7.
Figure 9:
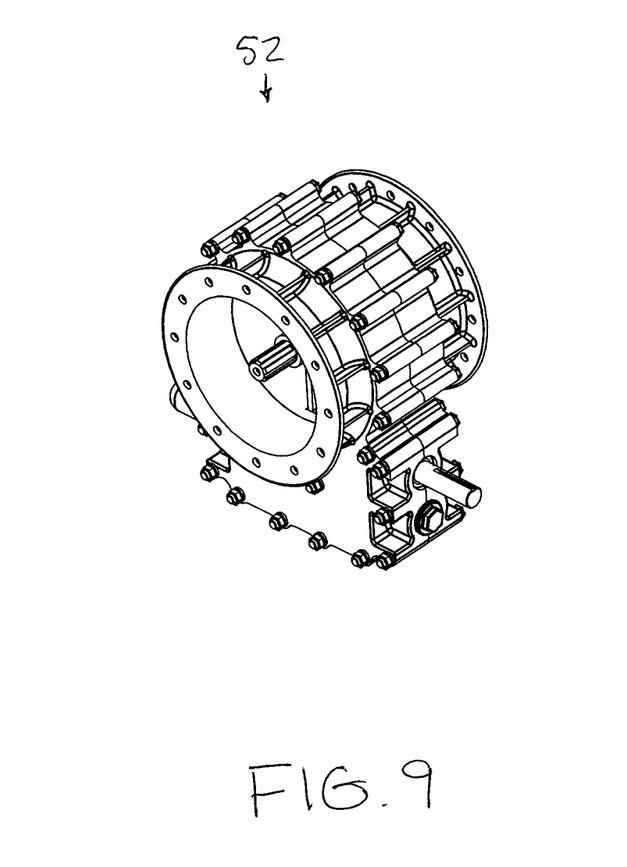
FIG. 9 is a perspective view of the inline drive assembly of the conveyor according to FIG. 1 shown separated from the auger housing.
Figure 10:
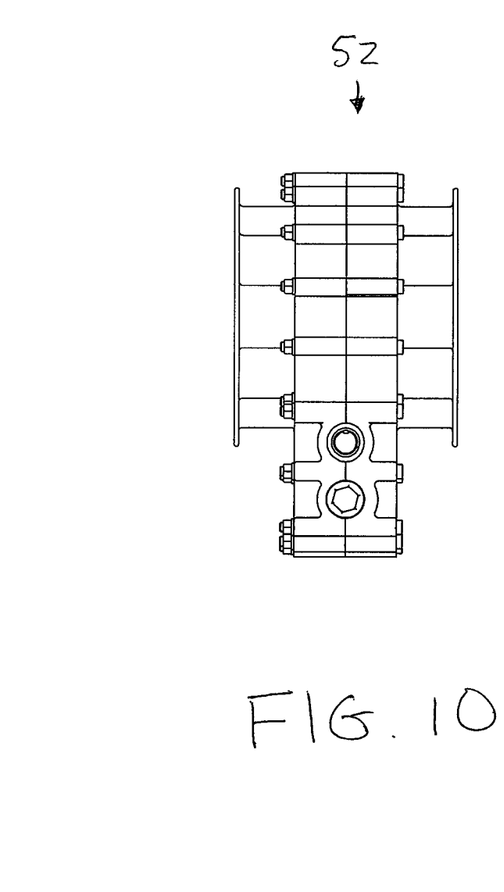
FIG. 10 is a side elevational view of the inline drive assembly according to FIG. 9.
Figure 11:
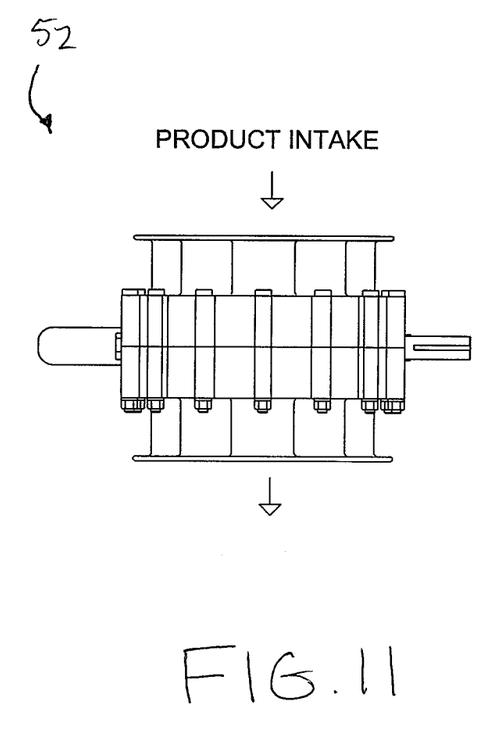
FIG. 11 is a top plan view of the inline drive assembly according to FIG. 9.
Figure 12:
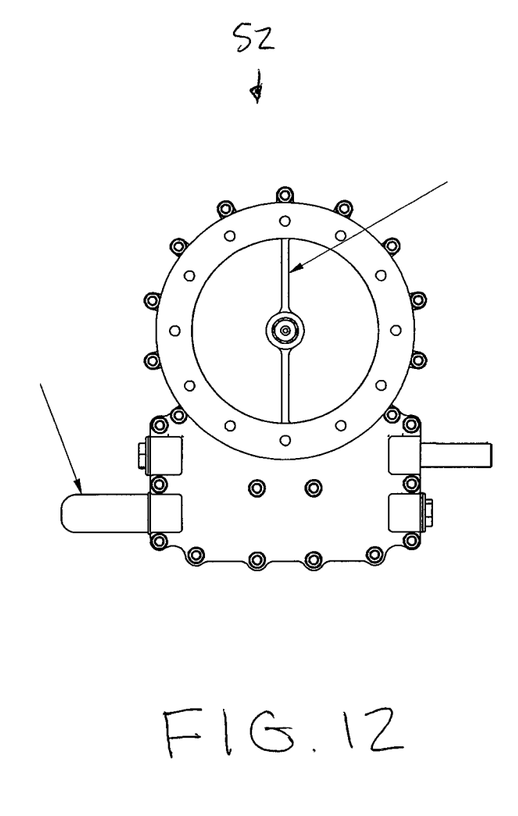
FIG. 12 is an end elevational view of the inline drive assembly according to FIG. 9.

The roller assembly 40 comprises a roller frame 42 which fully surrounds the auger housing in the circumferential direction. The frame includes two side plates 44 mounted parallel and spaced apart from one another adjacent the bottom side of the auger housing so as to be oriented substantially vertically and in the longitudinal direction of the auger housing.

Two bottom rollers 46 of the roller assembly are supported between the two side plates at longitudinally opposed ends thereof such that the rollers are rotatable about respective axes oriented perpendicularly to the longitudinal direction at longitudinally spaced positions for rolling engagement of the two rollers against the bottom side of the auger housing in direct contact with the cylindrical outer surface of the housing. The rollers include a concave profile for mating with the cylindrical outer surface of the housing.

The top ends of the two arms 38 of the second frame portion 32 of the carriage frame are pivotally coupled between the two side plates 44 at a central location in the longitudinal direction between the two bottom rollers 46. The roller frame 42 also includes a pair of side arms 48 joined at the bottom end at longitudinally spaced positions to each of the two side plates 44 to extend upwardly adjacent the respective side of the housing to top ends which are commonly coupled together at the top side of the auger housing.

A top roller 50 is rotatably supported between the two pairs of side arms for rolling engagement directly against the outer cylindrical surface of the auger housing at the top side at a diametrically opposed location from the bottom rollers. The top roller is longitudinally centered in relation to the two bottom rollers and similarly has a concave profile for direct mating engagement with the outer cylindrical top surface of the auger housing. The top roller rolls about a respective roller axis which is also parallel to the two bottom rollers.

The auger housing is formed in a plurality of modular sections connected in series with one another between the inlet and outlet ends. The auger member is similarly formed in modular sections such that each modular section of the auger member corresponds to a respective modular section of the auger housing. The modular sections permit driving rotation of the auger member relative to the auger housing an inline drive assembly 52 connected in series between respective sections of the auger housing and auger member. The inline drive assembly 52 is described in further detail below.

Among the modular sections of the auger housing is an inlet section 54 which extends between the guard member at the inlet end of the housing and the inline drive assembly 52 located nearer to the inlet end than the outlet end of the auger housing. The modular sections also include an intermediate section 56 spanning a majority of the length of the auger housing in the longitudinal direction from the outlet side of the inline drive assembly towards the outlet end of the auger housing.

Figure 1:
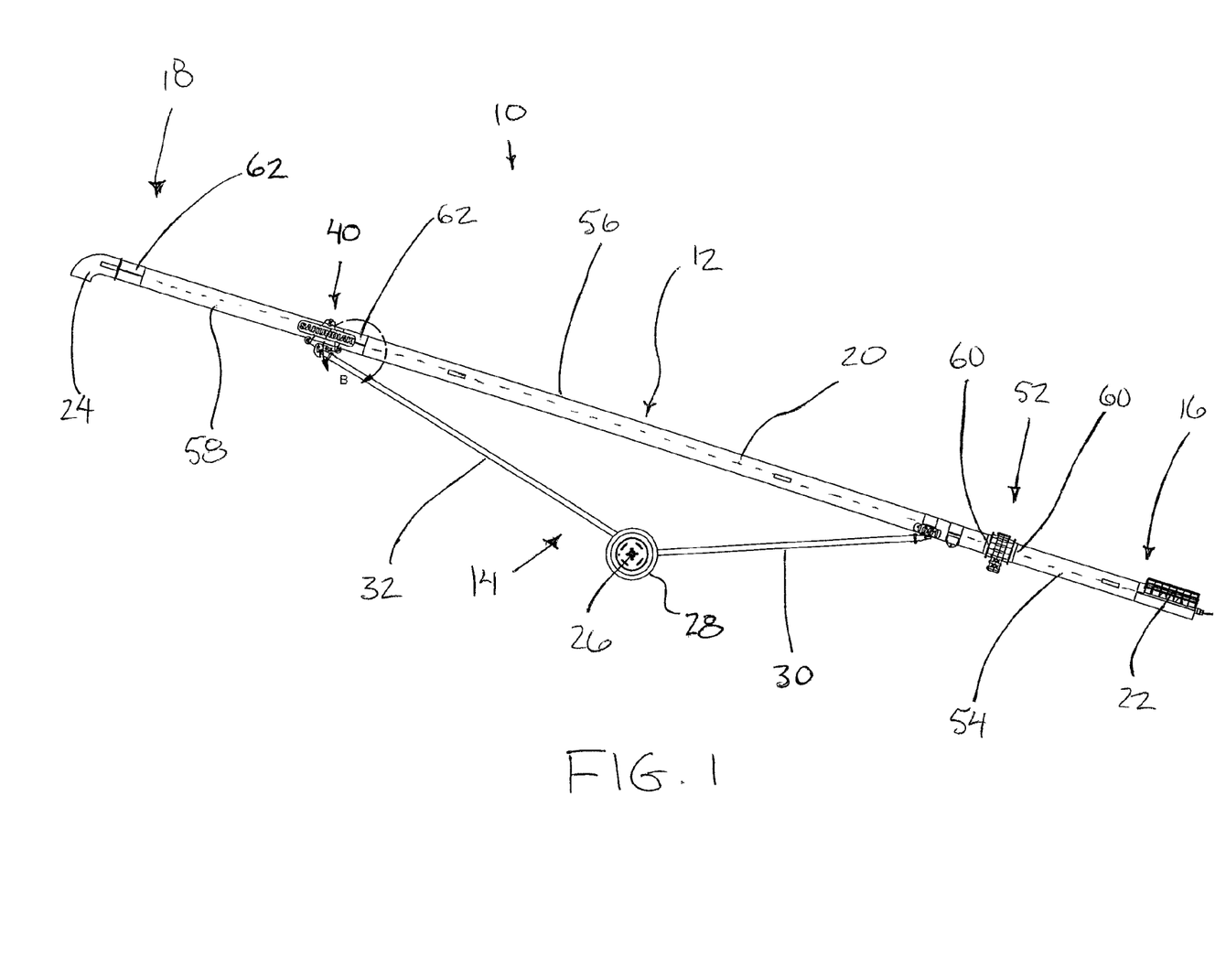
FIG. 1 is a side elevational view of a first embodiment of the agricultural conveyor.
Figure 2:
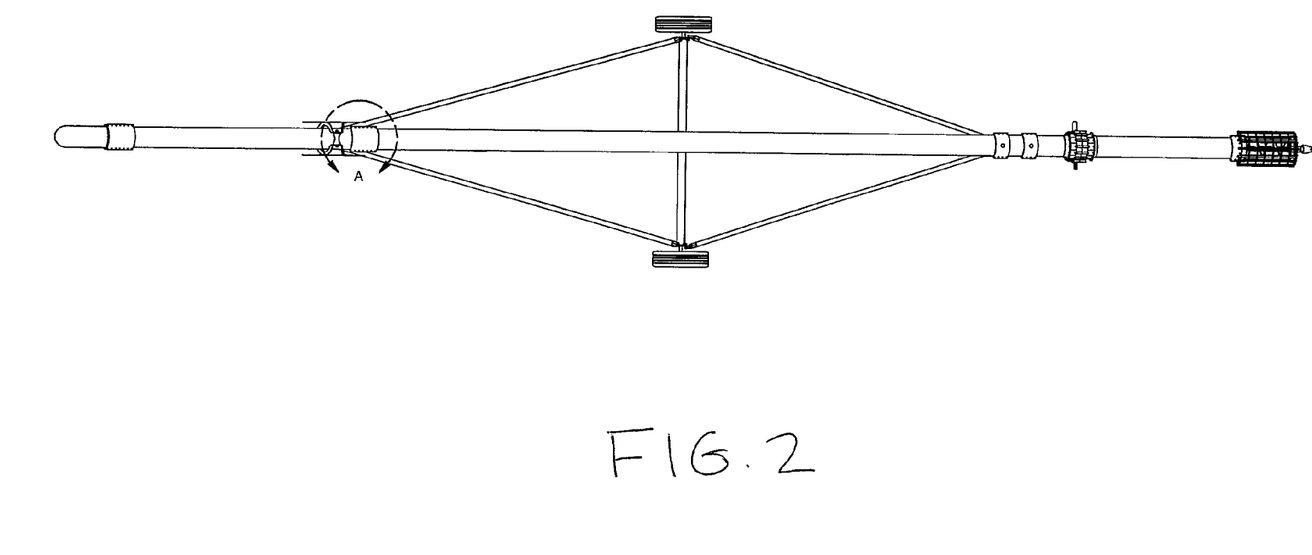
FIG. 2 is a top plan view of the conveyor according to FIG. 1.
Figure 6:
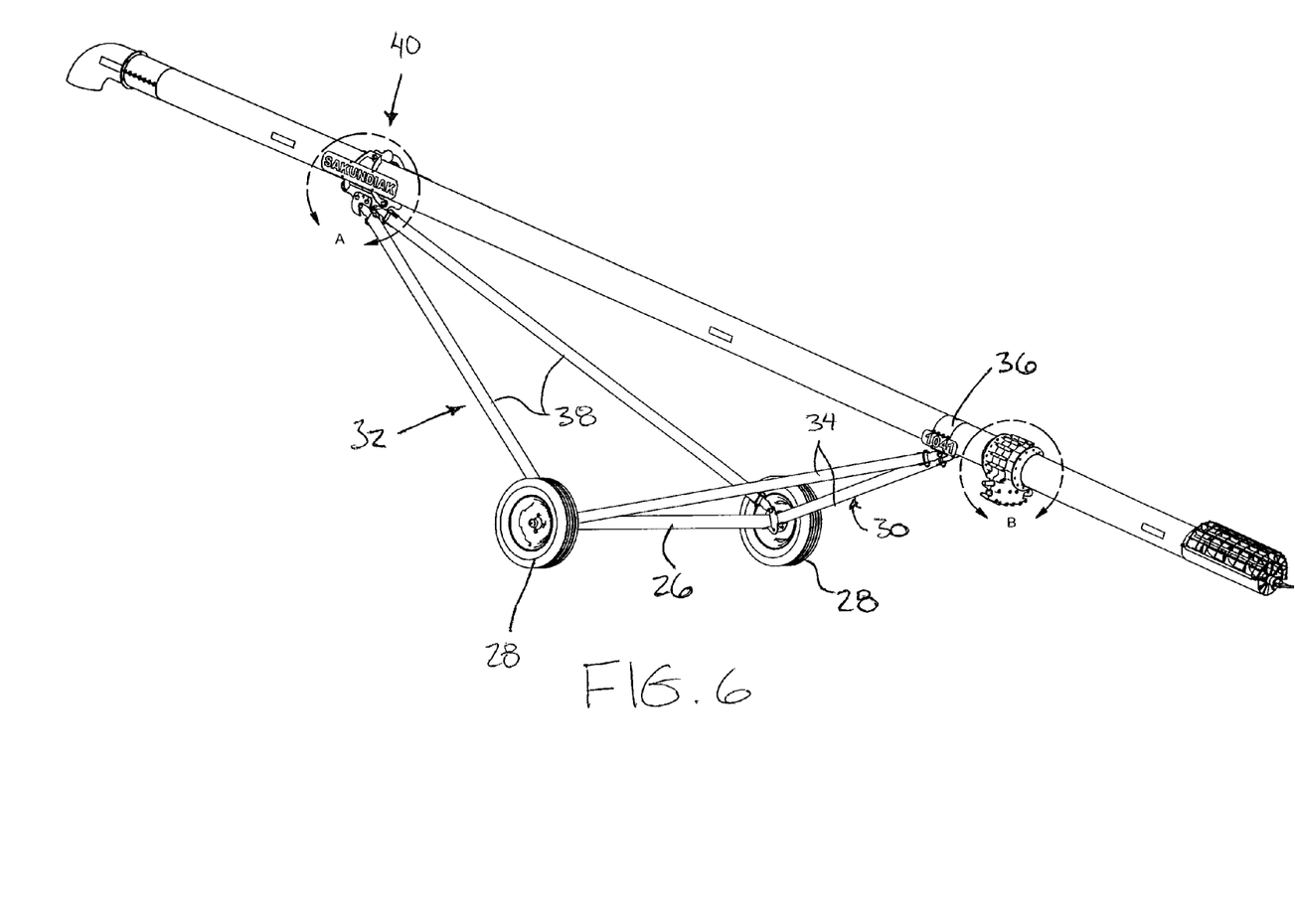
FIG. 6 is a perspective view of a second embodiment of the agricultural conveyor in which an upper modular section of the conveyor is shown removed in relation to the first embodiment of the conveyor.

In the embodiment of FIG. 6, in a shorter assembled configuration, the discharge spout 24 is connected directly to the outlet end of the intermediate section 56. When assembled in a longer configuration such as in FIG. 1, one or more additional outlet sections 58 are provided in series between the outlet end of the intermediate section 56 and the discharge spout.

The outlet end of the inlet section 54 and the inlet end of the intermediate section 56 each comprise an annular mounting flange 60 oriented perpendicularly to the longitudinal direction for fastening to corresponding mounting flanges at the inlet and outlet ends of the inline drive assembly and as described in further detail below.

Connections between the intermediate section 56 and the adjacent outlet section or the outlet spout, as well as an connections between adjacent outlet sections are provided with a mating connection 62 between adjacent modular sections of the auger housing that the roller assembly can readily roll over and roll past when adjusting the longitudinal position of the second location of the carriage assembly mounting to the auger housing.

At each mating connection 62 a connection plate 64 is coupled to the end of each of the connected modular sections of the auger housing. The connection plate 64 has a semicircular profile extending in the circumferential direction of the auger housing through an arc of approximately 180 degrees with an inner diameter corresponding to the outer diameter of the auger housing for direct mating connection therebetween. The connection plate 64 is welded to the end of the corresponding auger section such that half of the length of the connection plate in the longitudinal direction overlaps the end of the housing section while the remaining half of the length projects in the longitudinal direction outward beyond the end of the housing section.

When two adjacent sections of the auger housing are abutted end to end with one another, the respective connection plates 64 are aligned and joined with one another to form a continuous collar which fully surrounds the abutted junction between the ends of the two adjacent sections of the auger housing. The assembled collar formed by two joined connection plates 64 fully surrounds the housing in the circumferential direction and overlaps the end of each section of the auger housing by half the length of the connection plate in the longitudinal direction.

To join the two connection plates, mounting flanges 66 are provided along opposing side edges of each connection plate. The mounting flanges 66 all lie in a substantially common plane with a central longitudinal axis of the auger housing such that the flanges project radially outward from the auger housing and are oriented substantially in the longitudinal direction. The two mounting flanges integrally formed with one connection plate are thus abutted with the two mounting flanges of the other connection plate to permit fastening of the flanges together with suitable flanges. The joined flanges are thus positioned at diametrically opposed sides of the auger housing so as not to interfere with rolling contact of the rollers of the roller assembly with the corresponding top and bottom sides.

As the top and bottom surfaces of the auger housing are only interrupted by the thickness of the connection plate at each mating connection 62, the rollers can readily roll over the connection plates as they roll along the auger housing in the longitudinal direction during height adjustment of the auger. Furthermore, the side arms of the roller frame are spaced laterally outwardly in relation to the sides of the auger housing to accommodate the radial thickness of the mounting flanges 66 such that there is no interference between the roller frame and the components of the mating connection 62 between adjacent modular sections of the auger housing.

Figure 3:
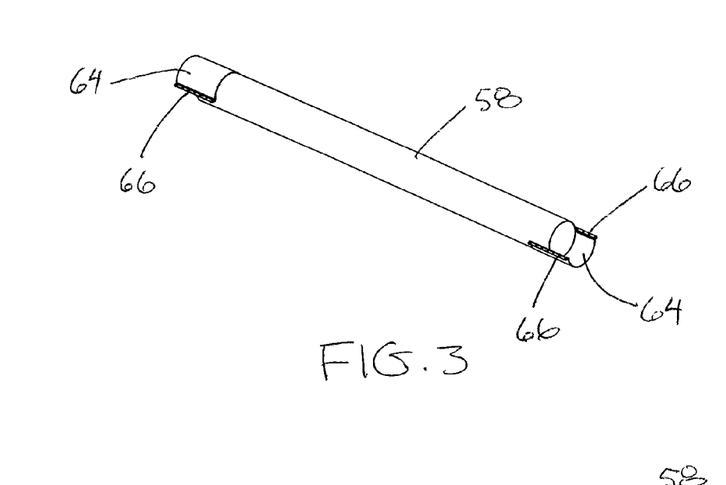
FIG. 3 is perspective view of one modular section of the conveyor according to FIG. 1.
Figure 4:
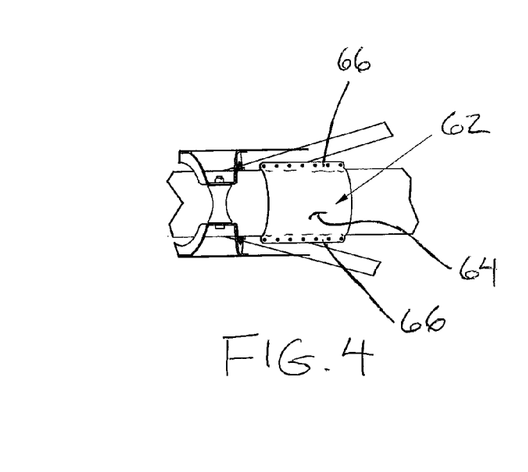
FIG. 4 is a top plan view of a connection between two adjacent modular sections of the auger housing in the conveyor according to FIG. 1.
Figure 5:
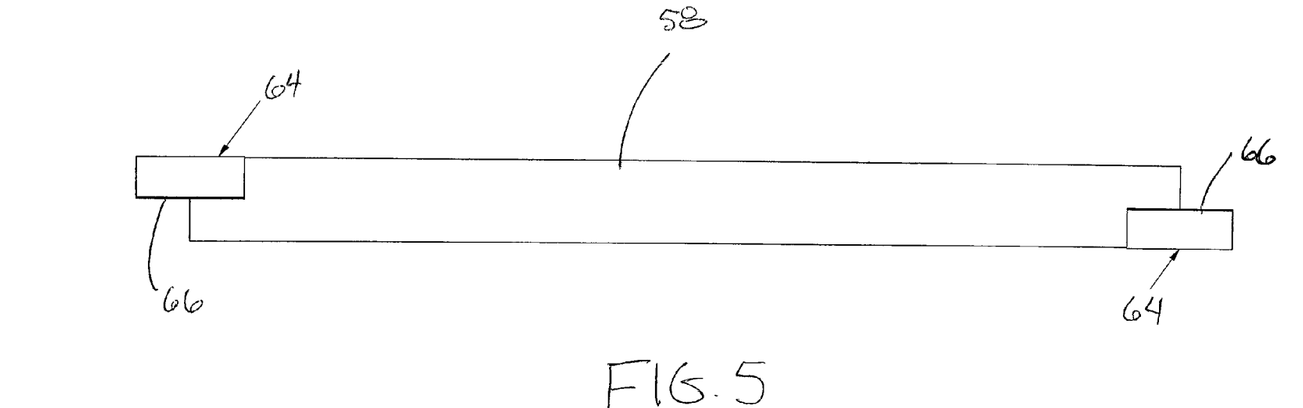
FIG. 5 is a side elevational view of the modular section of the conveyor according to FIG. 3.

As shown in FIGS. 3 and 5, each outlet section 58 is provided with a connection plate at each of the opposing ends thereof for connection to adjacent outlet sections or for connection to the outlet end of the intermediate section or the discharge spout respectively. In this instance, the outlet end of the intermediate section locates a connection plate at the top side thereof while the discharge spout locates a plate at the bottom side thereof so as to be diametrically opposite the intermediate section. By arranging the connection plates at opposing ends at each intermediate section to be secured to opposing top and bottom sides, the discharge spout is arranged to be connected directly to the intermediate section or with any number of outlet sections therebetween without requiring reconfiguration of the connection plates from the top to the bottom side or from the bottom side to the top side.

Turning now more particularly to FIGS. 9 through 13, the inline drive assembly will now be described in further detail. The inline drive assembly includes a drive member 68 which is connected in series between an inlet section of auger within the inlet section 54 of the auger housing and a main section of auger within the intermediate section 56 of the auger housing. The drive member 68 is coupled to rotate with the auger member relative to the housing.

The drive member 68 includes an outer collar 70 having an interior diameter which is substantially equal to the interior diameter of the auger housing such that the inner surface of the outer collar and the inner surface of the auger housing are substantially flush with one another in operation. An outer surface of the outer collar 70 includes a central portion 72 having a first outer diameter and two side portions 74 at axially opposing sides of the central portion for locating the central portion therebetween which have an outer diameter which is less than the central portion. A plurality of gear teeth 76 are integrally formed on the central portion at circumferentially spaced positions to define a ring gear integrally formed about the central portion of the outer collar.

The drive member 68 further includes an inner member 78 in the form of a sleeve which is coaxial with the surrounding outer collar and which has an outer diameter corresponding approximately to the diameter of a shaft portion of the auger member. A suitable shaft connector 80 provides a mating connection between the inner member 78 and the adjacent auger sections of the auger member for rotation together relative to the auger housing.

The drive member further includes two connecting arms 82 at diametrically opposed locations on the inner member 78 for spanning radially outward to connect between the inner member 78 and the outer collar 70. The connecting arms comprise flat plates oriented in the longitudinal direction having a width in the longitudinal direction which is near an axial length of the outer collar. The connecting arms ensure that the outer collar and the inner member form an integral member coupled to rotate with the auger member relative to the auger housing in operation.

The inline drive assembly further includes a drive housing 84 coupled in series with the auger housing and forming an outer shell which fully surrounds and encloses the drive member. The drive housing includes a first member 86 and a second member 88 which are substantially symmetrical to one another about a plane oriented perpendicularly to the longitudinal direction. Each of the first and second members form a portion of the outer shell fully surrounding the drive member.

More particularly each of the first member and the second member comprise a generally annular upper portion 90 surrounding the drive member and a lower gear case portion 92 coupled to the upper portion. The first member and the second member are joined to one another about a full circumference or periphery of the auger housing. Each member includes an inner side joined to the other member at the plane of symmetry therebetween and an axially opposed outer side locating an annular mounting flange perpendicular to the longitudinal direction for fastening connection to the corresponding mounting flange of the adjacent section of the auger housing.

Each of the first and second members includes a collar portion 96 at the outer side having an inner diameter which is substantially equal to the inner diameter of the auger housing such that the inner surface of the collar portions and the inner surface of the housing are substantially flush with one another. Each member also includes a gear portion 98 adjacent the inner side which is also generally cylindrical in shape but which has an inner diameter which is greater than an inner diameter of the collar portion so as to be stepped radially outward in relation to the collar portion. The two gear portions 98 of the assembled drive housing define a generally annular cylindrical chamber receiving the drive member 68 rotatably therein.

In this manner, the outer collar 70 of the drive member 68 is supported in series between the collar portions 96 of the first and second members of the drive housing which are in turn supported in series with adjacent sections of the auger housing. Each collar portion 96 is thus located directly between the outer collar of the drive member 68 and a respective one of the adjacent sections of the auger housing. A shoulder is defined between the gear portion 98 and the collar portion 96 of each of the first and second members such that the width in the axial direction between the two shoulders of the assembled drive housing is approximately equal to the length of the outer collar of the drive member in the longitudinal direction.

Two annular bearing assemblies 100 are mounted about the two side portions 74 of the outer collar of the drive member respectively. In this manner, each bearing is engaged in the radial direction between the outer collar 70 and the gear portion of a respective one of the first member 86 and second member 88 of the drive housing. A surface portion of the gear portion upon which the bearing is engaged thus defines an annular bearing surface providing radial support through the annular bearing to the outer collar 70.

The bearings also provide support in the axial direction as each bearing is abutted in the axial direction between the shoulder joining the collar portion and the gear portion of the respective member of the drive housing and the shoulder joining the side portion to the central portion of the outer collar of the drive member.

An opening is provided in the gear portion at the bottom side of the drive housing for communication between the annular upper portion 90 and the lower gear case portion 92 of each member of the drive housing. Various types of drives may be supported in the gear case portion for meshing engagement with the ring gear to drive rotation of the drive member and in turn drive rotation of the auger member relative to the auger housing.

As shown in the embodiment of FIGS. 1 through 13, a preferred embodiment of the drive within the gear case portion includes two shafts 102 rotatably supported within the gear case portion parallel to one another and perpendicular to the longitudinal direction of the auger housing at different radial distances from the auger housing. A pair of bearings at opposing ends of each shaft rotatably supports the shaft relative to the drive housing. Each shaft defines a respective input member having one end protruding outwardly from the drive housing to define an external input end 104 while extending inwardly through the auger housing wall to an opposing internal output end 106 in operative connection with the ring gear. The shaft 102 which is nearest to the ring gear locates a worm gear 108 thereabout for rotation with the shaft and in meshing engagement with the ring gear such that rotation of the shaft causes rotation of the ring gear through their meshing cooperation.

Figure 13:
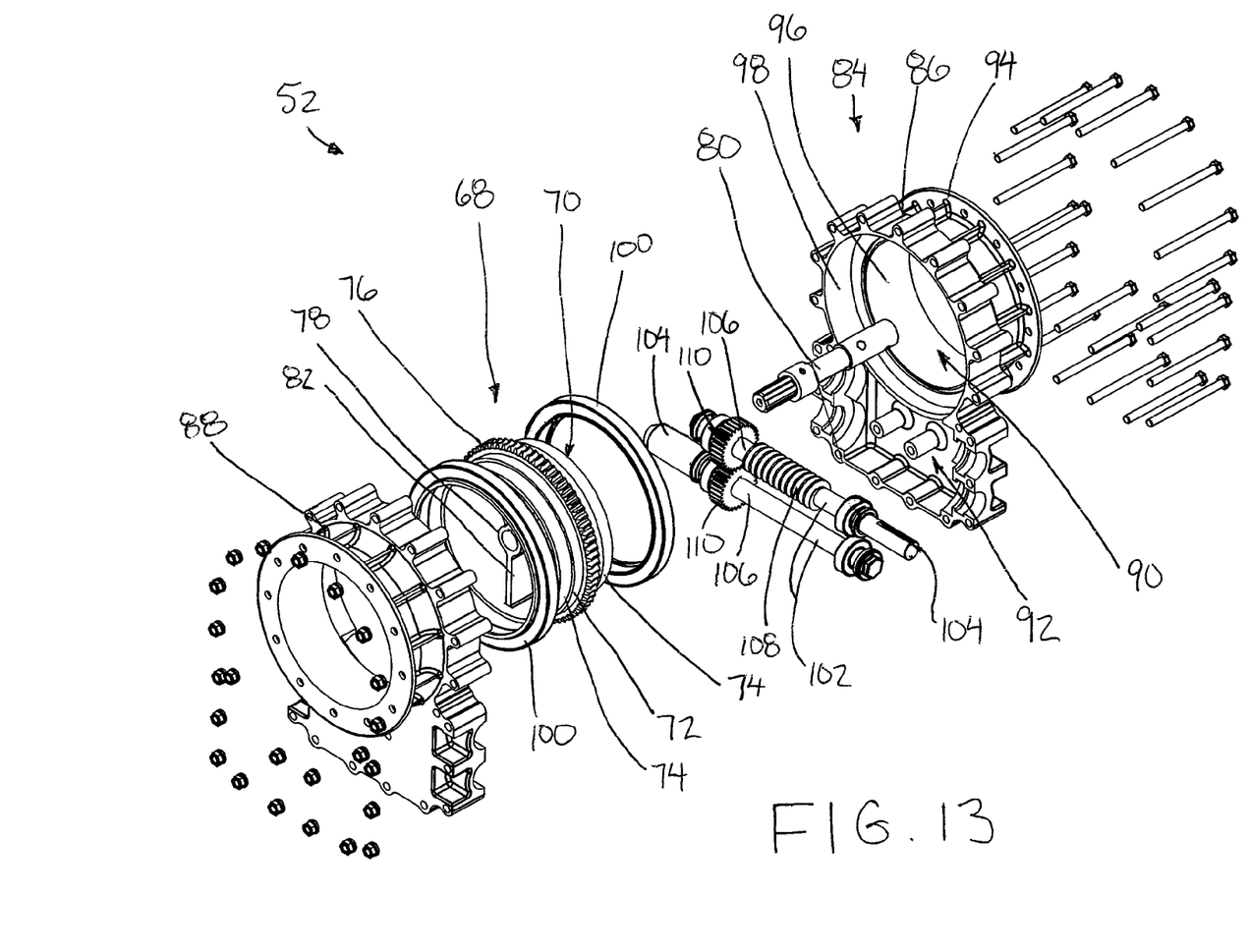
FIG. 13 is an exploded perspective view of the inline drive assembly according to FIG. 9.

To ensure the two shafts rotate together, a drive gear 110 is mounted on each shaft for rotation with the shaft adjacent one end thereof. The drive gears have circumferentially spaced teeth of similar number and configuration in meshing engagement with one another such that the two shafts counter-rotate but at the same speed. The input ends 104 of the two shafts protrude outwardly from opposing sides of the drive housing. Due to the mating connection through the two drive gears 110, rotation of either shaft by providing an input rotation at the input end thereof results in both shafts rotating which in turn rotates the worm gear and the ring gear in meshing engagement therewith for driving rotation of the auger member relative to the auger housing.

Figure 14:
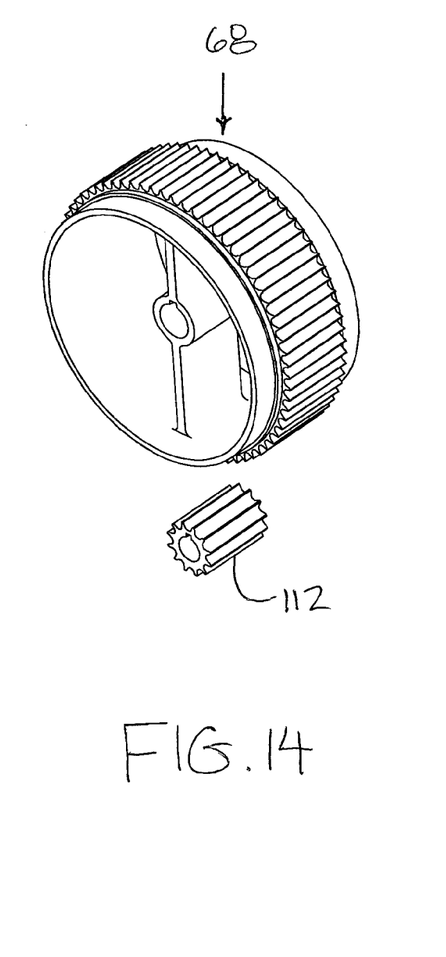
FIG. 14 is a perspective view of a second embodiment of the drive member of the inline drive assembly according to FIG. 9.
Figure 15:
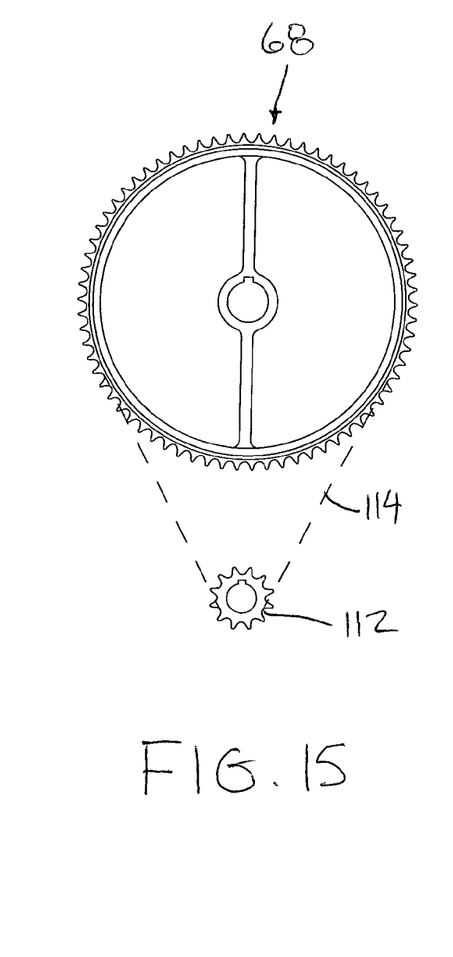
FIG. 15 is an end elevational view of the drive member according to FIG. 14.
Figure 16:
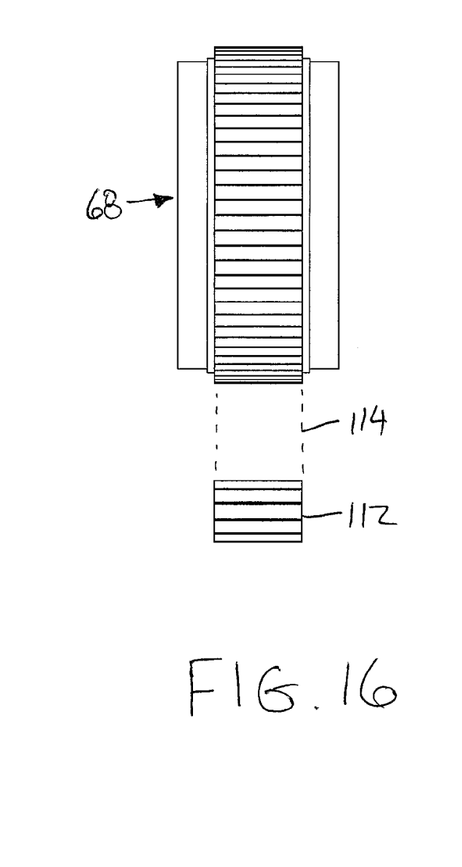
FIG. 16 is a side elevational view of the drive member according to FIG. 14.

According to a further embodiment as shown in FIGS. 14 through 16, the ring gear of the drive member can be rotated by providing a single drive gear 112 within the lower gear case portion of the housing. The drive gear is rotatable about an axis oriented parallel to the longitudinal direction of the auger housing at a location spaced below the ring gear. A toothed belt or chain 114 extends about the drive gear 112 and the ring gear in meshing engagement therewith such that providing an input rotation to the drive gear rotates the ring gear through the drive chain 114. A suitable shaft supports the drive gear thereon in which the shaft is supported relative to the drive housing by spaced apart bearings such that an input end of the shaft protrudes externally from the housing for receiving an input rotation as described above with regard to the previous embodiment.

In either embodiment, a motor is typically provided which may be supported directly on the carriage assembly or the auger housing or which may be provided by external equipment for connection to the input end of the drive shaft which provides the input rotation to drive the auger member relative to the auger housing. The inline drive assembly is particularly adapted for use with auger housing length without any modification being required as no drive connection is required at the outlet end of the auger housing as in conventional auger drives. By combining the use of the inline drive with the modular connections between adjacent auger sections as described above, using connection plates, the roller assembly can be easily mounted on various auger length configurations without any interference by drive components and without requiring any modification to the auger housing in the form of additional track components as the roller assembly can readily roll over the mating connections 62 without any modification. The overall combination of the inline drive, the configuration of the modular connections and the roller assembly provides for a particularly efficient method of manufacturing various auger lengths with a maximum number of common parts for reducing overall manufacturing costs.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An agricultural conveyor comprising:
an auger housing which is tubular and elongate in a longitudinal direction from an inlet end to an outlet end of the auger housing;
an auger member rotatably supported within the auger housing so as to be arranged to convey particulate material in the longitudinal direction from the inlet end to the outlet end of the auger housing; and
a carriage frame supporting the auger housing on wheels such that the auger housing extends at an upward inclination from the inlet end to the outlet end and such that the auger housing is arranged for rolling movement along the ground, the carriage frame comprising:
a first frame portion coupled to the auger housing at a first location;
a second frame portion coupled to the auger housing at a second location spaced from first location; and
a roller assembly coupling the second frame portion to the auger housing such that the second location of the second frame portion coupled to the auger housing is movable along the auger housing in the longitudinal direction relative to the first location of the first frame portion so as to vary an elevation of the outlet end of the auger housing relative to the ground;
the roller assembly including a top roller in rolling engagement with a top side of the auger housing and at least one bottom roller in rolling engagement with a bottom side of the auger housing such that the rollers are displaced in the longitudinal direction in rolling movement along the auger housing together with movement of the second frame portion along the auger housing as the elevation of the outlet end of the auger housing is varied.

2. The agricultural conveyor according to claim 1 wherein said at least one bottom roller comprises two bottom rollers engaging the bottom side of the auger housing at spaced apart locations in the longitudinal direction.

3. The agricultural conveyor according to claim 2 wherein the top roller engages the top side of the auger housing at a location between the two bottom rollers in the longitudinal direction.

4. The agricultural conveyor according to claim 1 wherein the roller assembly includes a roller frame which fully surrounds the auger housing and supports the rollers thereon.

5. The agricultural conveyor according to claim 4 wherein the second frame portion of the carriage frame is pivotally coupled to the roller frame.

6. The agricultural conveyor according to claim 1 wherein the first location of the first frame portion coupled to the auger housing is fixed.

7. The agricultural conveyor according to claim 1 wherein the auger housing comprises a plurality of modular sections which are coupled in series with one another and wherein the rollers of the roller assembly are arranged to roll along the auger housing in the longitudinal direction across a connection between an adjacent pair of the modular sections.

8. The agricultural conveyor according to claim 7 wherein the connection between each adjacent pair of modular sections comprises a pair of mounting flanges mounted on each modular section at diametrically opposing sides of the modular section, the pair mounting flanges of one modular section being fastened to the pair of mounting flanges of the other modular section at each connection.

9. The agricultural conveyor according to claim 8 wherein the mounting flanges lie in a substantially common plane oriented parallel to the longitudinal direction.

10. The agricultural conveyor according to claim 8 wherein the connection between each adjacent pair of modular sections further comprises:
 a pair of connection plates fixed to the pair of modular sections respectively such that each connection plate extends in a longitudinal direction beyond an end of the respective modular section of the auger housing towards the other modular section of the connection;
 each connection plate being generally semicircular in shape such that the pair of connection plates are coupled to form a mounting collar mounted in series between the ends of the adjacent pair of modular sections at the connection; and
 the pairs of mounting flanges being supported along opposing sides of the pair of connection plates respectively.

11. The agricultural conveyor according to claim 1 wherein the auger housing comprises a pair of modular sections connected in series with one another, wherein the auger member comprises a pair of modular sections connected in series with one another and associated with respective ones of the modular sections of the auger housing, and wherein the agricultural conveyor further comprises an inline drive assembly coupled to the auger member to drive rotation of the auger member relative to the auger housing, the inline drive assembly comprising:
 a drive member including an outer collar supported in series between the pair of modular sections of the auger housing such that an inner surface of the outer collar is substantially flush with an inner surface of the auger housing, an inner member connected in series between the pair of modular sections of the auger member for rotation therewith, and at least one connecting arm connected between the inner member and the outer collar such that the outer collar is rotatable with the auger member relative to the auger housing;
 a drive housing connected in series between the pair of modular sections of the auger housing so as to fully surround the drive member, the drive housing including a first member joined to one of the modular sections of the auger housing and a second member joined to the other modular section of the auger housing;
 the first member and the second member of the drive housing being joined to one another about a full circumference of the auger housing;
 each of the first member and the second member of the drive housing including a collar portion having an inner surface which is substantially flush with the inner surface of the auger housing and being supported in series between the outer collar of the drive member and a respective one of the modular sections of the auger housing;
 a bearing assembly coupled between the outer collar of the drive member and each collar portion of the drive housing so as to rotatably support the outer collar of the drive member relative to both the first and second members of the drive housing respectively; and
 an input member rotatably supported on the drive housing to extend through the drive housing from an external input end arranged to receive an input rotation to an internal output end in operative connection with the drive member to drive rotation of the drive member and the auger member connected thereto in response to the input rotation.

12. The agricultural conveyor according to claim 11 wherein the first member and the second member of the drive housing are substantially symmetrical to one another about a plane oriented perpendicularly to the longitudinal direction of the auger housing.

13. The agricultural conveyor according to claim 11 wherein each of the first member and the second member of the drive housing include an annular bearing surface adjacent to the collar portion and having an inner diameter which is greater than an inner diameter of the collar portion, and wherein each bearing assembly comprises an annular bearing member received between the outer collar of the drive member and the annular bearing surface of the respective member of the drive housing.

14. The agricultural conveyor according to claim 13 wherein an outer surface of the outer collar of the drive member includes a central portion and a pair of side portions along axially opposing sides of the central portion which have an outer diameter which is less than an outer diameter of the central portion, each side portion receiving a respective one of the annular bearing members thereabout.

15. An agricultural conveyor comprising:
 an auger housing which is tubular and elongate in a longitudinal direction from an inlet end to an outlet end of the auger housing in which the auger housing comprises a plurality of modular sections which are coupled in series with one another to define at least one connection between an adjacent pair of the modular sections;
 an auger member rotatably supported within the auger housing so as to be arranged to convey particulate material in the longitudinal direction from the inlet end to the outlet end of the auger housing; and
 a carriage frame supporting the auger housing on wheels such that the auger housing extends at an upward inclination from the inlet end to the outlet end and such that the auger housing is arranged for rolling movement along the ground, the carriage frame comprising:
 a first frame portion coupled to the auger housing at a first location;
 a second frame portion coupled to the auger housing at a second location spaced from first location; and
 a roller assembly coupling the second frame portion to the auger housing such that the second location of the second frame portion coupled to the auger housing is movable along the auger housing in the longitudinal direction relative to the first location of the first frame portion so as to vary an elevation of the outlet end of the auger housing relative to the ground;
 the roller assembly including rollers in rolling engagement with the auger housing such that the rollers are displaced in the longitudinal direction along the auger housing together with movement of the second frame portion along the auger housing as the elevation of the outlet end of the auger housing is varied;
 the rollers being arranged to roll along the auger housing in the longitudinal direction across said at least one connection.

16. The agricultural conveyor according to claim 15 wherein the connection between each adjacent pair of modular sections comprises a pair of mounting flanges mounted on each modular section at diametrically opposing sides of the modular section, the pair mounting flanges of one modular section being fastened to the pair of mounting flanges of the other modular section at each connection.

17. The agricultural conveyor according to claim 16 wherein the mounting flanges lie in a substantially common plane oriented parallel to the longitudinal direction.

18. The agricultural conveyor according to claim 16 wherein the connection between each adjacent pair of modular sections further comprises:
    a pair of connection plates fixed to the pair of modular sections respectively such that each connection plate extends in a longitudinal direction beyond an end of the respective modular section of the auger housing towards the other modular section of the connection;
    each connection plate being generally semicircular in shape such that the pair of connection plates are coupled to form a mounting collar mounted in series between the ends of the adjacent pair of modular sections at the connection; and
    the pairs of mounting flanges being supported along opposing sides of the pair of connection plates respectively.

19. An agricultural conveyor comprising:
    an auger housing which is tubular and elongate in a longitudinal direction from an inlet end to an outlet end of the auger housing in which the auger housing comprises a pair of modular sections connected in series with one another;
    an auger member rotatably supported within the auger housing so as to be arranged to convey particulate material in the longitudinal direction from the inlet end to the outlet end of the auger housing, in which the auger member comprises a pair of modular sections connected in series with one another and associated with respective ones of the modular sections of the auger housing;
    a carriage frame supporting the auger housing on wheels such that the auger housing extends at an upward inclination from the inlet end to the outlet end and such that the auger housing is arranged for rolling movement along the ground;
    an inline drive assembly coupled to the auger member to drive rotation of the auger member relative to the auger housing, the inline drive assembly comprising:
        a drive member including an outer collar supported in series between the pair of modular sections of the auger housing such that an inner surface of the outer collar is substantially flush with an inner surface of the auger housing, an inner member connected in series between the pair of modular sections of the auger member for rotation therewith, and at least one connecting arm connected between the inner member and the outer collar such that the outer collar is rotatable with the auger member relative to the auger housing;
        a drive housing connected in series between the pair of modular sections of the auger housing so as to fully surround the drive member, the drive housing including a first member joined to one of the modular sections of the auger housing and a second member joined to the other modular section of the auger housing;
        the first member and the second member of the drive housing being joined to one another about a full circumference of the auger housing;
        each of the first member and the second member of the drive housing including a collar portion having an inner surface which is substantially flush with the inner surface of the auger housing and being supported in series between the outer collar of the drive member and a respective one of the modular sections of the auger housing;
        a bearing assembly coupled between the outer collar of the drive member and each collar portion of the drive housing so as to rotatably-support the outer collar of the drive member relative to both the first and second members of the drive housing respectively; and
        an input member rotatably supported on the drive housing to extend through the drive housing from an external input end arranged to receive an input rotation and an internal output end in operative connection with the drive member to drive rotation of the drive member and the auger member connected thereto in response to the input rotation.

20. The agricultural conveyor according to claim 19 wherein:
    each of the first member and the second member of the drive housing include an annular bearing surface adjacent to the collar portion and having an inner diameter which is greater than an inner diameter of the collar portion;
    each bearing assembly comprises an annular bearing member received between the outer collar of the drive member and the annular bearing surface of the respective member of the drive housing;
    an outer surface of the outer collar of the drive member includes a central portion and a pair of side portions along axially opposing sides of the central portion which have an outer diameter which is less than an outer diameter of the central portion, and
    each side portion receives a respective one of the annular bearing members thereabout.

* * * * *